(12) United States Patent
Granot et al.

(10) Patent No.: US 10,071,325 B2
(45) Date of Patent: Sep. 11, 2018

(54) AIR FLOW ENHANCED SELF-CLEANING DISC FILTER APPARATUS

(71) Applicant: TAVLIT PLASTIC LTD., Yavne (IL)

(72) Inventors: Moshe Granot, Adanim (IL); Yotam Granot, Adanim (IL)

(73) Assignee: TAVLIT PLASTIC LTD., Yavne (IL)

( * ) Notice: Subject to any disclaimer, the term of this patent is extended or adjusted under 35 U.S.C. 154(b) by 0 days.

(21) Appl. No.: 15/118,194

(22) PCT Filed: Feb. 11, 2015

(86) PCT No.: PCT/IL2015/050160
§ 371 (c)(1),
(2) Date: Aug. 11, 2016

(87) PCT Pub. No.: WO2015/121860
PCT Pub. Date: Aug. 20, 2015

(65) Prior Publication Data
US 2017/0173504 A1    Jun. 22, 2017

Related U.S. Application Data

(60) Provisional application No. 61/938,477, filed on Feb. 11, 2014.

(51) Int. Cl.
*B01D 29/68* (2006.01)
*B01D 29/46* (2006.01)
*B01F 5/04* (2006.01)

(52) U.S. Cl.
CPC .............. *B01D 29/68* (2013.01); *B01D 29/46* (2013.01); *B01F 5/04* (2013.01)

(58) Field of Classification Search
None
See application file for complete search history.

(56) References Cited

U.S. PATENT DOCUMENTS 4,552,655 A    11/1985  Granot
5,401,405 A *   3/1995  McDougald ......... B01D 24/005
                                                210/273

(Continued)

FOREIGN PATENT DOCUMENTS

EP    2 016 987    1/2009

OTHER PUBLICATIONS

International Search Report for International Application PCT/IL2015/050160, dated Jun. 10, 2015.

(Continued)

*Primary Examiner* — Krishnan S Menon
*Assistant Examiner* — Bradley R Spies
(74) *Attorney, Agent, or Firm* — The Law Office of Joseph L. Felber

(57) ABSTRACT

The present invention relates to water filters utilizing disc filter elements and in particular, to such a filtering apparatus having self-cleaning capabilities by utilizing automated back-flushing to clean the filtering elements where the self-cleaning process is enhanced by introducing a secondary flowing fluid, preferably atmospheric air, into the back-flushing stream. The filter apparatus is further enhanced with a disc filter spine having a plurality of spray nozzles arranged on the spine channels that may be adapted to produce a cleaning flowing fluid jet stream at a variety of angles facilitating cleaning, separation and spinning of the disc filtering elements. The filter apparatus may further enhance the cleaning process by introducing a flushing apparatus adapted to facilitate removal of effluent from the filter.

11 Claims, 15 Drawing Sheets

(56) References Cited

U.S. PATENT DOCUMENTS

| | | | | |
|---|---|---|---|---|
| 5,595,655 | A | * | 1/1997 | Steiner .................. B01D 29/15 |
| | | | | 210/391 |
| 6,093,329 | A | * | 7/2000 | McDougald ......... B01D 24/005 |
| | | | | 210/274 |
| 7,329,343 | B1 | | 2/2008 | Barnes |
| 8,061,387 | B1 | * | 11/2011 | Barnes ................. B01F 1/0033 |
| | | | | 137/889 |
| 8,323,511 | B1 | | 12/2012 | Barnes |
| 2001/0040122 | A1 | | 11/2001 | Barnes |
| 2005/0173336 | A1 | | 8/2005 | Arnaud |
| 2005/0178704 | A1 | | 8/2005 | Prochaska et al. |
| 2007/0095742 | A1 | | 5/2007 | Ruskin |
| 2016/0129377 | A1 | * | 5/2016 | Stewart ................. B01D 33/50 |
| | | | | 210/107 |

OTHER PUBLICATIONS

Written Opinion for International Application PCT/IL2015/050160, dated Jun. 10, 2015.
International Preliminary Report on Patentability for International Application PCT/IL2015/050160, dated Apr. 5, 2016.

* cited by examiner

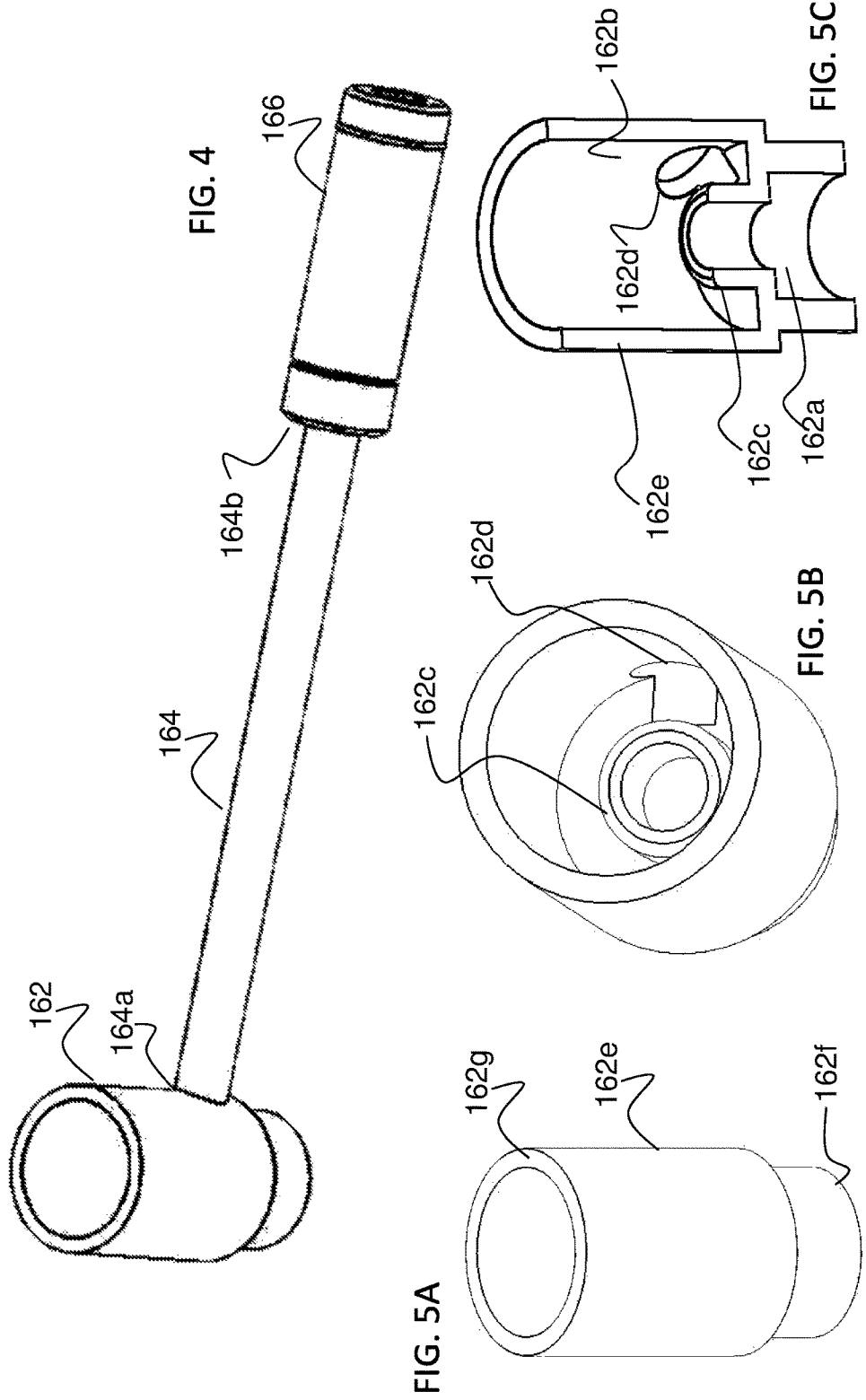

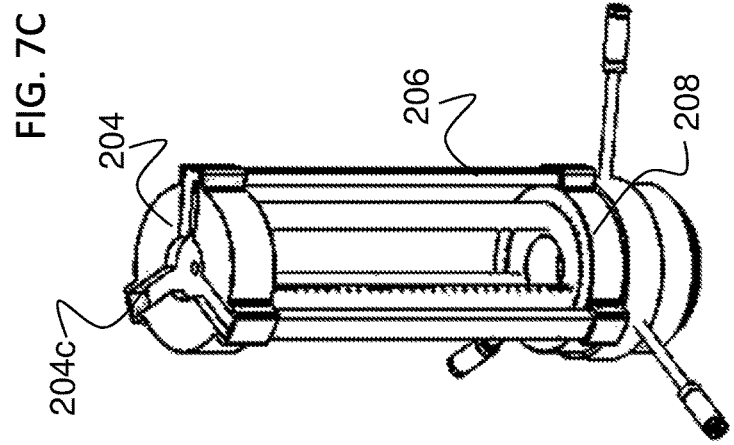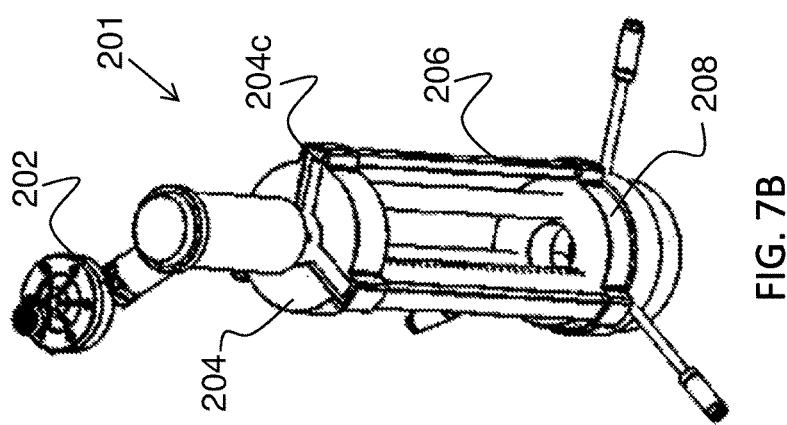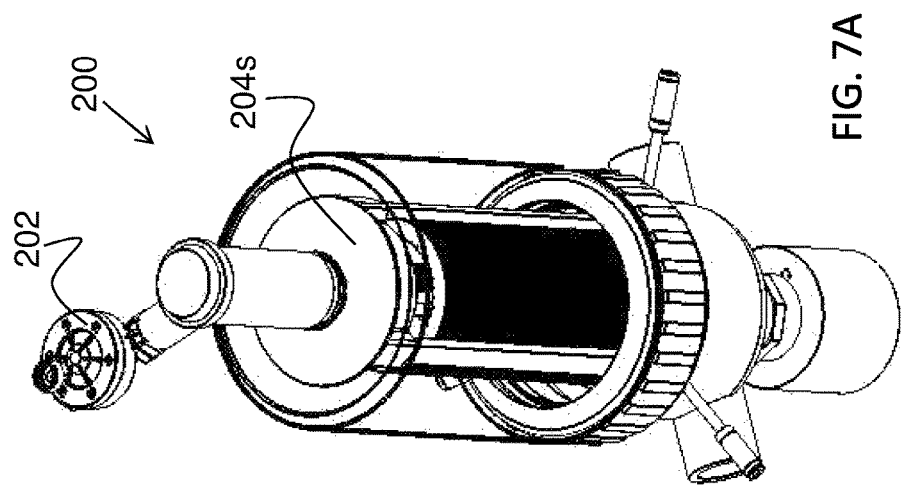

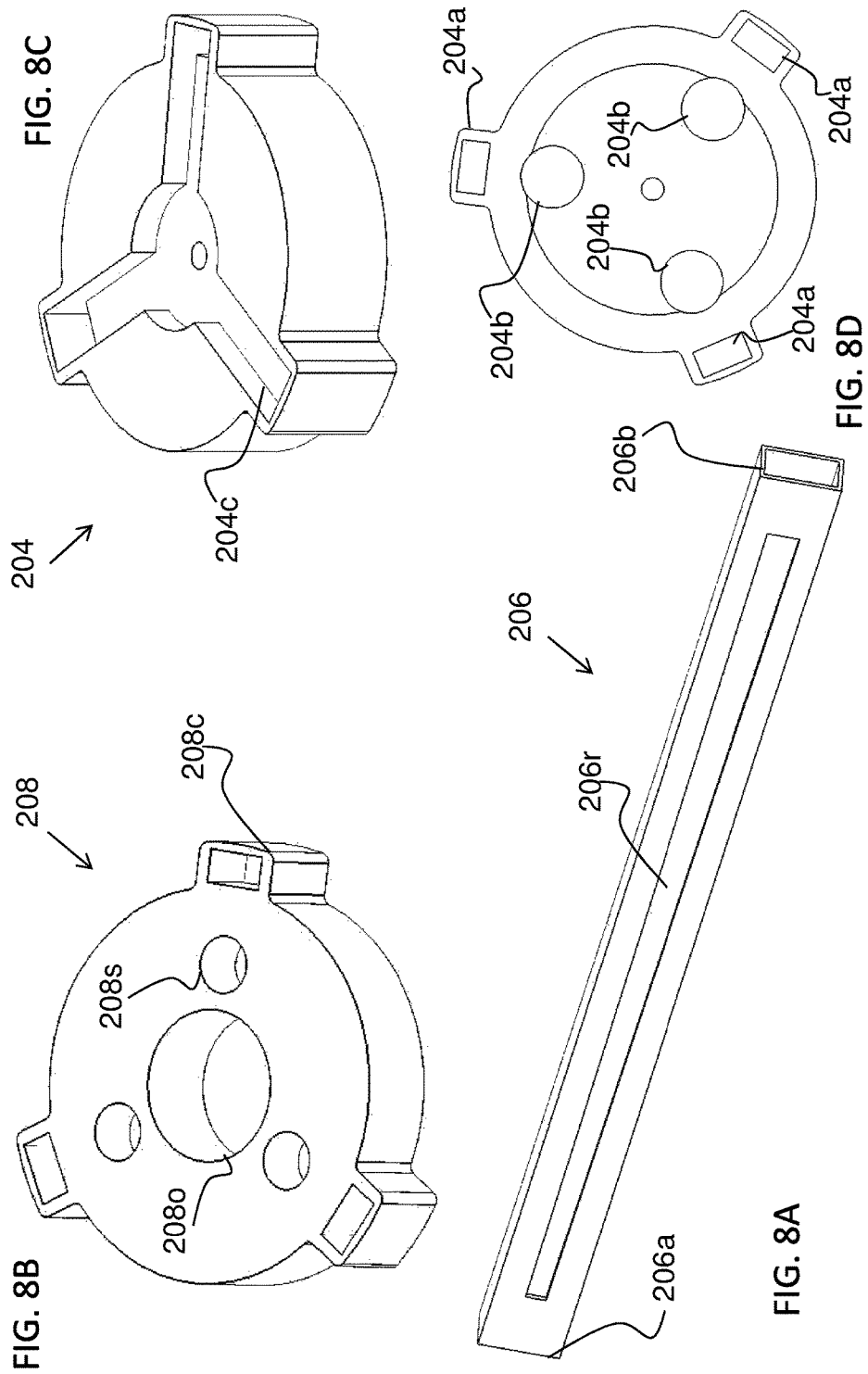

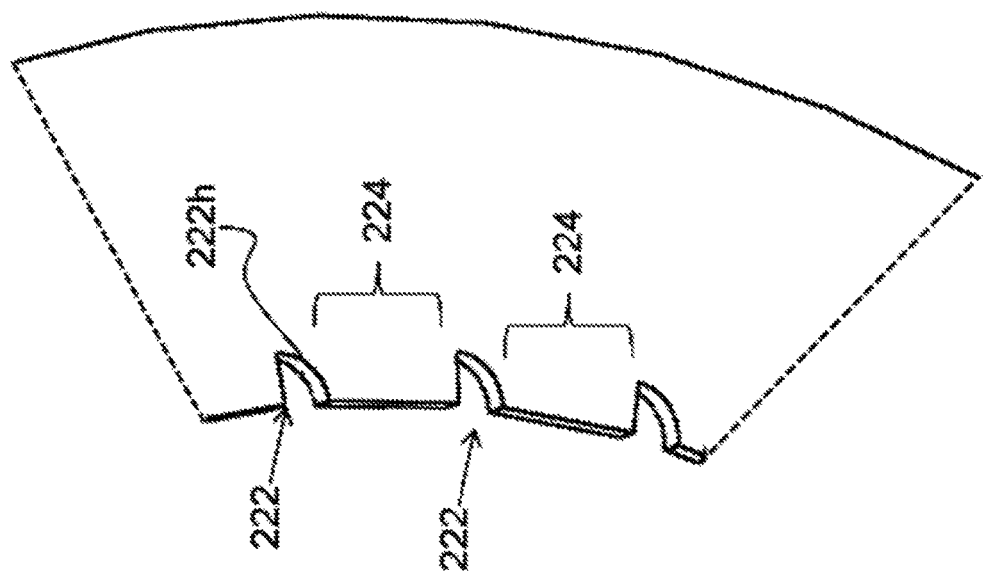
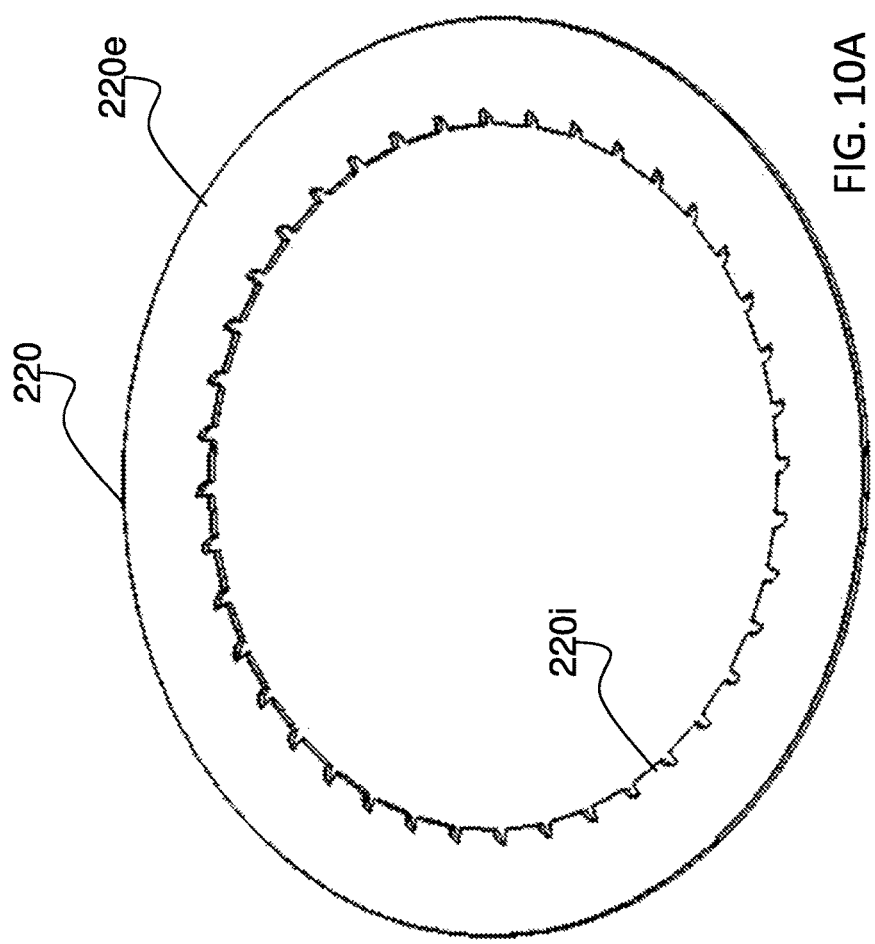
FIG. 10B
FIG. 10A

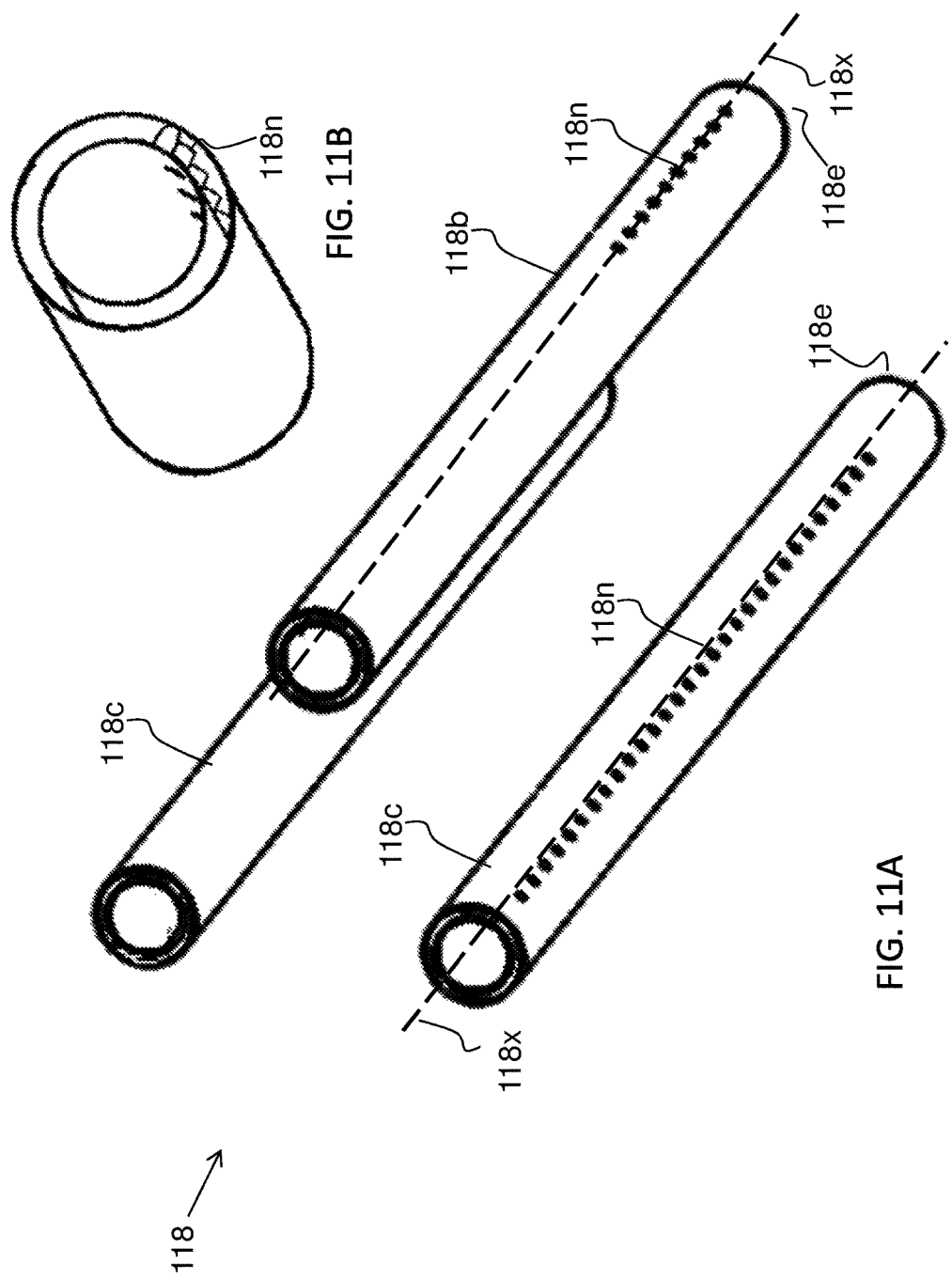

AIR FLOW ENHANCED SELF-CLEANING DISC FILTER APPARATUS

FIELD OF THE INVENTION

The present invention relates to water filtering apparatus utilizing disc filter elements and in particular, to such a filtering apparatus having self-cleaning capabilities by utilizing automated back-flushing to clean the filtering elements where the self-cleaning process is enhanced by introducing air into the back-flushing stream.

BACKGROUND OF THE INVENTION

The present invention relates to filter apparatus, and particularly to a self-cleaning filter which automatically cleans itself after it has accumulated a predetermined quantity of particles filtered from the fluid. The invention is particularly useful for filtering water irrigation systems and is therefore described below with respect to such an application, but it will be appreciated that the invention could advantageously be used in other applications as well.

Irrigation systems commonly include filters for removing foreign particles, for example sand or sediments, from the water in order to prevent clogging of the water irrigation devices, such as water sprinklers or drip emitters, connected to the water supply line. It is advantageous in such applications to have the filter clean itself periodically, as required, without either turning off the water, or detaching the filter from the water supply line.

Many disc filters are used to filter upstream water across a compressed stack of disc-like filtering elements. The disc-like filtering elements are stacked on a spine that facilitates aligning the disc stack. The compressed disc stack form a filtering element that traps sediments along the disc surface and/or along the external (upstream) surface of the stack of discs. In that way upstream water is filtered across the disc stack to produce downstream clean water.

One known way for self-cleaning such a disc filter in such applications is by reverse flushing. During back flushing process the reverse flow, downstream to upstream, is used to unstack the filtering elements and to flush out and therefore clean the filtering discs from any associated sediments. Part of the reverse flow stream is piped through the filter's spine into channels having multiple spray nozzles configured to produce a tangential flow through each nozzle. The tangential flow is used to clean the disc filtering elements across its surface. The tangential flow further causes the filtering disc elements to spin while filtered debris is flushed away from its filtering surface and toward the upstream inlet. In this manner the reverse flow is used for flushing the filtering elements from trapped debris allowing the filtering system to continuously work.

Usually such self-cleaning disc filters are utilized in a network of filters that are controlled with various valve control arrangements so that certain filters in the network are used during the normal filtering operation, but upon the accumulation of an undue amount of foreign material within the filter, causing increased pressure differential across the filter, which signals to valve controls, directing the flow of water through the filter network, to redirect the water to flow through other filters in the network while the dirtied filters are flushed by the reverse flow, as described.

The cleaning rate of such filtering networks are co-related to the quality of the water being filtered, however, the filtering networks, particularly the cleaning process, are not sufficiently efficient or optimized. Specifically the pressure differential required to trigger the cleaning process and the pressure at which the reverse flushing is effectively performed are not optimized in state of the art back-flushing disc filter networks.

SUMMARY OF THE INVENTION

An object of the present invention is to provide a novel form of self-cleaning filter apparatus where the filtering and cleaning process are optimized, therein reducing the frequency of the cleaning process and the back-flow pressure required to achieve cleaning of the disc filters.

The present invention overcomes the deficiencies of the background by enhancing the back-flushing cleaning process by introducing air flow during the back-flushing cleaning process, where most preferably the air sources is atmospheric air without an external pressure for example with a compressor. The introduction of air flow within the back-flushing water stream significantly increases the cleaning efficiency of the disc filter network as low as 0.8 bar and allows higher differential pressure before initiating the cleaning process.

An optional embodiment of the present invention provides a self-cleaning water filter utilizing disc filters, where a back-flushing water stream is used to clean the disc filters, the filter characterized in that air is introduced into the back-flushing water stream to enhance the cleaning process. Preferably air is introduced into the back-flushing water stream with at least one or more venturi element.

Optionally the venturi elements may be disposed at various locations along the back flushing water stream pipeline. Optionally a plurality of venturi elements may be disposed along the back-flushing water stream pipeline. Optionally a plurality of different venturi elements may be disposed at various locations along the back-flushing water stream pipeline.

Optionally the venturi elements may be disposed internally within the filter assembly housing, for example along the internal piping and/or fluid flow path internal to the filter housing.

Optionally the venturi elements may be disposed externally to the filter assembly housing, for example along at least one or more of the filter housing inlet and/or outlet.

Optionally a plurality of venturi elements may be disposed at a particular location along the back flushing water stream pipeline, for example including but not limited to at the entry point of the back flushing water.

Preferably a venturi element is associated along the back-flushing water stream pathway at the spine spray channel. Optionally the venturi element may be associated and/or coupled with a pipe and check valve forming a venturi element assembly.

Optionally at least one venturi element may be associated with the water filter at the downstream end, back-flushing water stream inlet.

Optionally the venturi element and/or venturi element assembly may be retrofit with off the shelf water disc filters.

Embodiments of the present invention provides a self-cleaning filter apparatus for filtering a primary flowing fluid, the apparatus adapted to be connected to a supply line for the primary flowing fluid, the self-cleaning filter apparatus amendable to operation in a filter mode or a self-cleaning mode, the apparatus comprising:

a housing having an inlet on the upstream side to receive un-filtered flowing fluid, and an outlet on the downstream side to deliver clean filtered fluid, the housing adapted to encase a plurality of filtering elements utilized to filter the flowing fluid as the fluid flows from the upstream inlet to the downstream outlet, the filtering elements provided in the form of disc filters are arranged on a spine assembly, wherein the filtering elements are tightly stacked along the length of the spine during filtering mode and un-stacked during self-cleaning mode, wherein stacking and un-stacking the filtering elements on the spine may be driven with a controllable piston assembly, the piston assembly controlled according to differential pressure between the inlet and the outlet to un-stack the filtering elements during self-cleaning and stack the filtering elements during filtering;

the spine assembly including at least one tubular conduit having an open end configured to be in fluid communication with the downstream outlet during the self-cleaning mode; the tubular conduit having a plurality of nozzle spray openings dispersed along its length, the open end provided to receive a flow of downstream flowing fluid from the downstream outlet during self-cleaning mode wherein the downstream flowing fluid flows along the length of the conduit through the open end wherein the nozzles may be configured to produce tangential fluid stream of the downstream flowing fluid to clean the plurality of filtering elements during self-cleaning mode; and wherein the spine assembly may be characterized in that the at least one tubular conduit having an open end is coupled with a venturi member assembly comprising a venturi element that is provided to introduce at least one secondary flowing fluid into the primary flowing fluid during the self-cleaning mode by way of utilizing the venturi effect.

Optionally the spine assembly may be characterized in that the at least one tubular conduit having an open end is coupled with a venturi member assembly provided to introduce at least one secondary flowing fluid during the self-cleaning mode, the venturi member assembly comprising: a venturi conduit member having a substantially tubular body having an external surface defined between a first open end and a second open end, the second open end is configured to be in fluid communication with the spine conduit open end, the tubular body having an internal passageway constricting the internal diameter of the tubular body, wherein the constricting passageway defines a first portion and a second portion; the second portion having an opening defined on the external surface disposed adjacent to the constriction point; and secondary flowing fluid tubular pipe having a first end internal to the filter housing and a second end external to the filter housing, wherein the first end is in fluid communication with and coupled with the venturi conduit member over the opening; the second end coupled with a one way valve provided to introduce the secondary flowing fluid into the tubular pipe toward the first end.

Optionally the filter element may further comprise a further external venturi element associated with the downstream outlet externally to the filter housing.

Optionally the spine assembly may include at least three tubular conduits each associated with an individual venturi member assembly.

Optionally and preferably the primary flowing fluid is water and the secondary flowing fluid is air.

Optionally venturi conduit member may be configurable according to at least one parameter for example including but not limited to at least one or more selected from the group comprising the size of the constricting passageway, the internal diameter of the constriction and the opening, any combination thereof.

Optionally the venturi conduit member may be configured according to the quality of the upstream primary flowing fluid.

Optionally the venturi conduit member may be configured according to the fluid pressure of the upstream primary flowing fluid.

Optionally the filter assembly may further comprise a flush port assembly over a flush port outlet disposed on a portion of the filter housing, the apparatus including:

a controllable flush valve associated with a flush port assembly cover over the flush port outlet; wherein the flush valve is closed during filtering mode and open during self-cleaning mode; the flush port assembly cover controllably associated with a flush assembly cap, the cap having at least one internal fluid channel that is in fluid communication between the controllable flush valve and at least one suction conduit;

the at least one suction conduit having a substantially hollow body comprising a first end associated with a flush port assembly base and a second end associated with the cap; and a longitudinal recess along the long side of the suction conduit between the base and the cap, the longitudinal recess provided to receive a portion of the reverse flow flowing fluid used during self-cleaning; the flowing fluid is flushed from the recess, to the channel, to the port and finally exits through the flush valve during self-cleaning.

Embodiments of the present invention may provide a venturi apparatus for retrofitting an off the shelf self-cleaning disc filter apparatus, the apparatus comprising: a retrofit housing for securely coupling with at least one portion of the off the shelf self-cleaning disc filer housing; an adaptor for securely coupling with the open end of the spine assembly of the off the shelf cleaning disc filter, the adaptor comprising a venturi member assembly provided to introduce at least one secondary flowing fluid during the self-cleaning mode, the venturi member assembly comprising: a venturi conduit member having a substantially tubular body having an external surface defined between a first open end and a second open end, the second open end in fluid communication with the spine open end, the tubular body having an internal passageway constricting the internal diameter of the tubular body, wherein the constricting passageway defines a first portion and a second portion; the second portion having an opening defined on the external surface and disposed adjacent to the constriction point; and a secondary flowing fluid tubular pipe having a first end internal to the retrofit housing and a second end external to the retrofit housing, wherein the first end is in fluid communication with and coupled with the venturi conduit member over the opening; and the second end coupled with a one way valve provided to introduce the secondary flowing fluid into the tubular pipe toward the first end.

Embodiments of the present invention provide a filter disc having a disc like shape having an inner diameter defining an inner edge and an outer diameter defining an outer edge, the disc filter characterized in that the inner edge includes a plurality of substantially triangular recess.

Embodiments of the present invention provides a spine channel for a self-cleaning water filter, the spine channel having a substantially tubular body having at least one open end and a plurality of nozzles arranged along its length, the nozzles arranged along a nozzle axis, the nozzle axis having a configuration selected from the group consisting of linear, radial, spiral, intermittent, arcuate, sigmoid, helical, sawtooth, step-wise, or any combination thereof.

Optionally the nozzles may be configured according to at least one or more nozzle parameters selected from the group comprising of angle, diameter, shape, intended use, location along channel the like or any combination thereof.

Optionally and preferably embodiments of the present invention provides for introducing air facilitating and improving the separation of the filtering elements during self-cleaning mode. Optionally and preferably the introduced air provides for facilitating and increasing water flow through filter assembly. Optionally and preferably the introduced air provides for facilitating and increasing water flow through filter assembly in both modes namely, the filtering mode or the back-flow cleaning mode.

Optionally and preferably the introduced air provides for facilitating releasing and dislodging sediments from the surface of the filtering elements.

Within the context of this application the term flowing fluid may interchangeably refers to any liquid, gas, air, or a mixture thereof.

Within the context of this application the term venturi element refers to an element and/or part that facilitate the creating of the venturi effect along a stream of a flowing fluid. A venturi element may be utilized to create differential pressure at a narrowing section and/or point along the path of a primary flowing fluid, where the narrowing creates lower pressure around the narrowing. The reduced pressure around the narrowing may then be utilized for the introduction of a secondary flowing fluid by the creation of a suction port adjacent to the narrowing.

Unless otherwise defined, all technical and scientific terms used herein have the same meaning as commonly understood by one of ordinary skill in the art to which this invention belongs. The materials, methods, and examples provided herein are illustrative only and not intended to be limiting.

Implementation of the method and system of the present invention involves performing or completing certain selected tasks or steps manually, automatically, or a combination thereof.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in order to provide what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIG. 4 is a schematic illustrative diagram of a venturi member assembly according to an optional embodiment of the present invention;

FIG. 5A-C are various views of a venturi member according to an optional embodiment of the present invention;

FIG. 7A-D are schematic illustrative diagram of a filter apparatus including a flush valve assembly according to an optional embodiment of the present invention;

FIG. 8A-D are schematic illustrative diagram of components of the flush valve assembly of FIG. 7A-D, according to an optional embodiment of the present invention;

FIG. 10A-B are schematic illustrative diagrams of a disc filter element according to an optional embodiment of the present invention; and FIG. 11A-B are schematic illustrative diagrams of a spine assembly and spine channels according to an optional embodiment of the present invention.

DESCRIPTION OF THE PREFERRED EMBODIMENTS

The principles and operation of the present invention may be better understood with reference to the drawings and the accompanying description. The following figure reference labels are used throughout the description to refer to similarly functioning components are used throughout the specification hereinbelow.

| | |
|---|---|
| 10 | Prior Art reverse-flow filter assembly; |
| 12 | upper housing member; |
| 14 | lower housing member; |
| 14i | upstream inlet; |
| 14o | downstream outlet; |
| 16 | piston assembly; |
| 18 | spine assembly; |
| 20 | disc filtering element; |
| 100 | filter assembly; |
| 112 | upper housing member; |
| 114 | lower housing member; |
| 114v | venturi assembly opening; |
| 114i | upstream inlet; |
| 114o | downstream outlet; |
| 116 | piston assembly; |
| 116a | one way check valve; |
| 116b | piston assembly check valve spring; |
| 118 | spine assembly; |
| 118b | spine channel; |
| 118c | spine assembly channel; |
| 118e | channel open end; |
| 118n | spine spray nozzles; |
| 118x | spine nozzle axis; |
| 120 | disc filtering element; |
| 150 | retrofit venturi assembly; |
| 152 | spine assembly base; |
| 152a | central opening; |
| 152b | venturi member receiving recess; |
| 154 | venturi assembly holding ring; |
| 154r | pipe opening; |

-continued

| | |
|---|---|
| 160 | venturi member assembly; |
| 162 | venturi conduit member; |
| 162a | first portion; |
| 162b | second portion; |
| 162c | internal constriction passageway; |
| 162d | opening; |
| 162e | external surface; |
| 162f | first open end; |
| 162g | second open end; |
| 164 | tubular pipe; |
| 164a | pipe first end; |
| 164b | pipe second end; |
| 166 | one way valve; |
| 200 | filter assembly with flush port assembly; |
| 201 | flush port assembly; |
| 202 | flush port valve; |
| 204 | flush assembly cap; |
| 204a | conduit receiving recess; |
| 204b | spine receiving recess; |
| 204c | cap channel; |
| 204s | cap seal |
| 206 | flush port suction conduit; |
| 206a | first end; |
| 206b | second end; |
| 206r | suction conduit recess; |
| 208 | flush port base; |
| 208c | conduit receiving recess; |
| 208o | central opening; |
| 208s | spine receiving recess; |
| 210 | downstream external venturi element; |
| 220 | disc filter; |
| 220i | internal diameter edge; |
| 220e | external diameter edge; |
| 222 | triangular recess; |
| 222h | curved hypotenuse; |
| 224 | trapezoid segment; |

Figure 1:
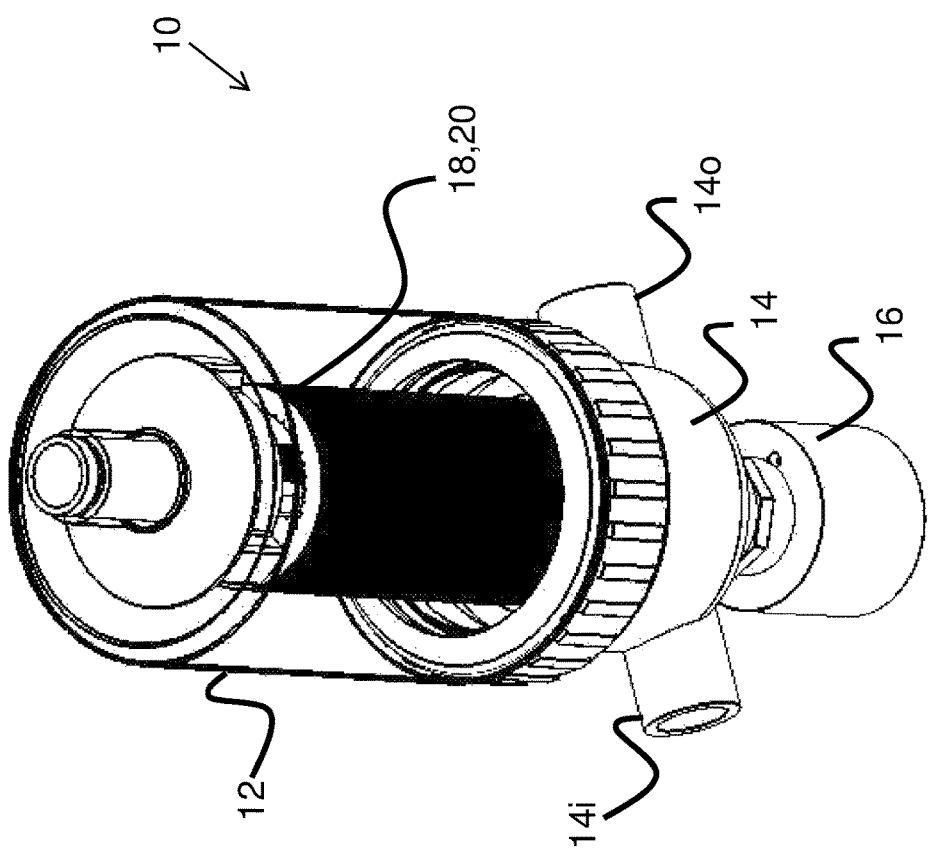
FIG. 1 is a schematic illustrative diagram of a prior art filter apparatus having filter mode and reverse flushing self-cleaning mode.

Referring now to the drawings, FIG. 1 shows a schematic illustration of prior art self-cleaning filter assembly 10 that may be assembled to form a network of self-cleaning filters. Such networks interconnect a plurality of filters with a valve assembly manifold so as to allow self-cleaning by way of back flushing. The valve assembly manifold at each of the inlet 14i and outlet 14o, effectively controls the direction of flow through the filter housing, upstream to downstream when in filtering mode and back flushing from downstream to upstream when in self-cleaning mode.

Each filter assembly includes a filter housing having an inlet 14i for receiving unfiltered flowing fluid on the upstream side and an outlet 14o for delivering the filtered flowing on the downstream side. The housing is generally composed of at least two part an upper portion 12 and lower portion 14. The unfiltered flowing fluid flows across a filter body, assembled on a filter spine 18 that houses a plurality of stackable disc filtering elements 20. The stackable filtering elements are configured to be unstack along the filter spine 18 allowing the disc filters 20 to be separated from each other and cleaned during self-cleaning mode and to be re-stacked along the filter spine during filtering mode. The disc filters 20 are configured to stack or unstack along the spine with a drive element in the form of a piston assembly 16. The piston assembly 16 is controlled to stack, by way of pressing the disc filters together, or unstacking the filtering elements 20, by way of releasing the pressure applied onto the stacked filtering elements 20, along the spine 18 based on a control signal reiterating the pressure differential between the inlet 14i and outlet 14o. The pressure differential indicates when the filtering elements require cleaning and therefore trigger the reverse flow self-cleaning process.

During self-cleaning mode, downstream clean flowing fluid flows from the outlet 14o toward the inlet 14i. In so doing, the reverse flow, flushes the sediments accumulated on the now unstacked released filtering elements 20. During the reverse flow a portion of the downstream flowing fluid is directed through channels in the spine assembly 18, the channels having opening forming spray nozzles that are configured to form a tangential flow directed toward the unstacked disc filters 20 utilized to spin and further clean the disc filters 20.

The reverse flow cleaning process of the prior art filtering device 10 and filter networks formed therewith is limited in that such filtering devices are less efficient than the filter assembly according to the present invention. The efficiency of the filtering device as measured in terms of the frequency with which the cleaning process is initiated, the maximum differential pressure and amount of dirt built on the disk at initiation of the cleaning process is lower than present invention, and the pressure at which the self-cleaning process is carried out.

Accordingly embodiments of the present invention are configured to enhance and increase the efficiency of the back-flushing self-cleaning process known from the prior art, therein increasing the differential pressure allowed at the process, reducing the frequency of the self-cleaning process, reducing the volume of back-flush effluent, reducing the working pressure as low as 0.8 bar therein retaining more downstream clean flowing fluid.

Figure 2A:
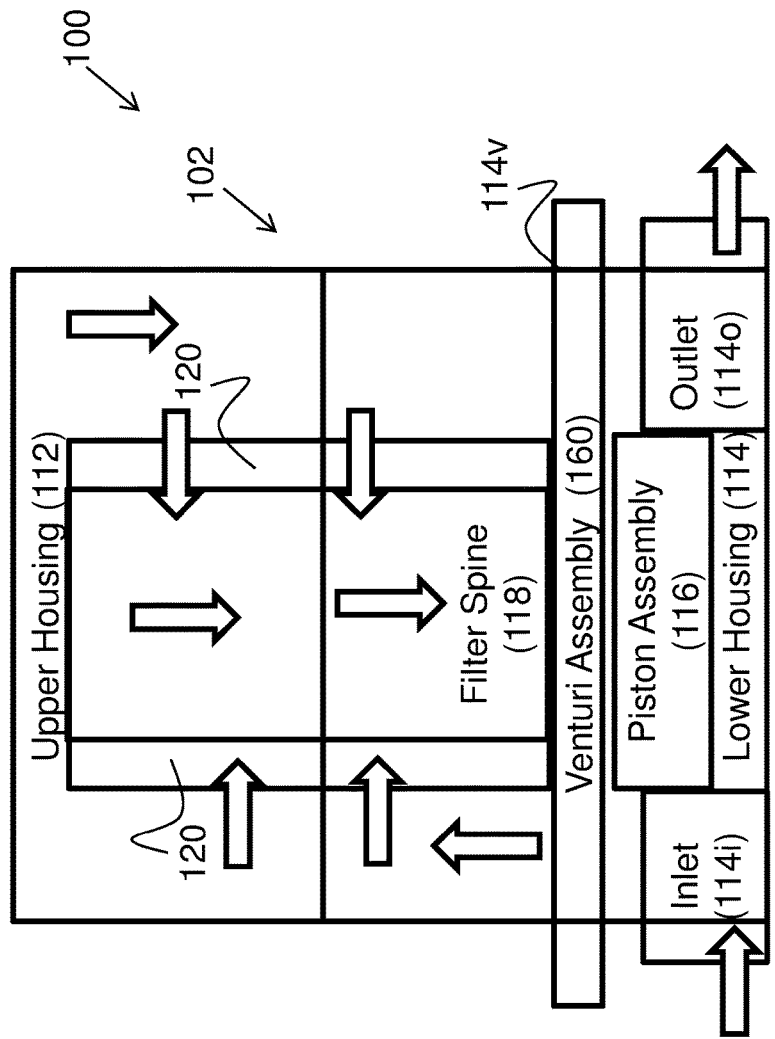
FIG. 2A-B is a schematic block diagram of a filter apparatus according to an optional embodiment of the present invention.
Figure 2B:
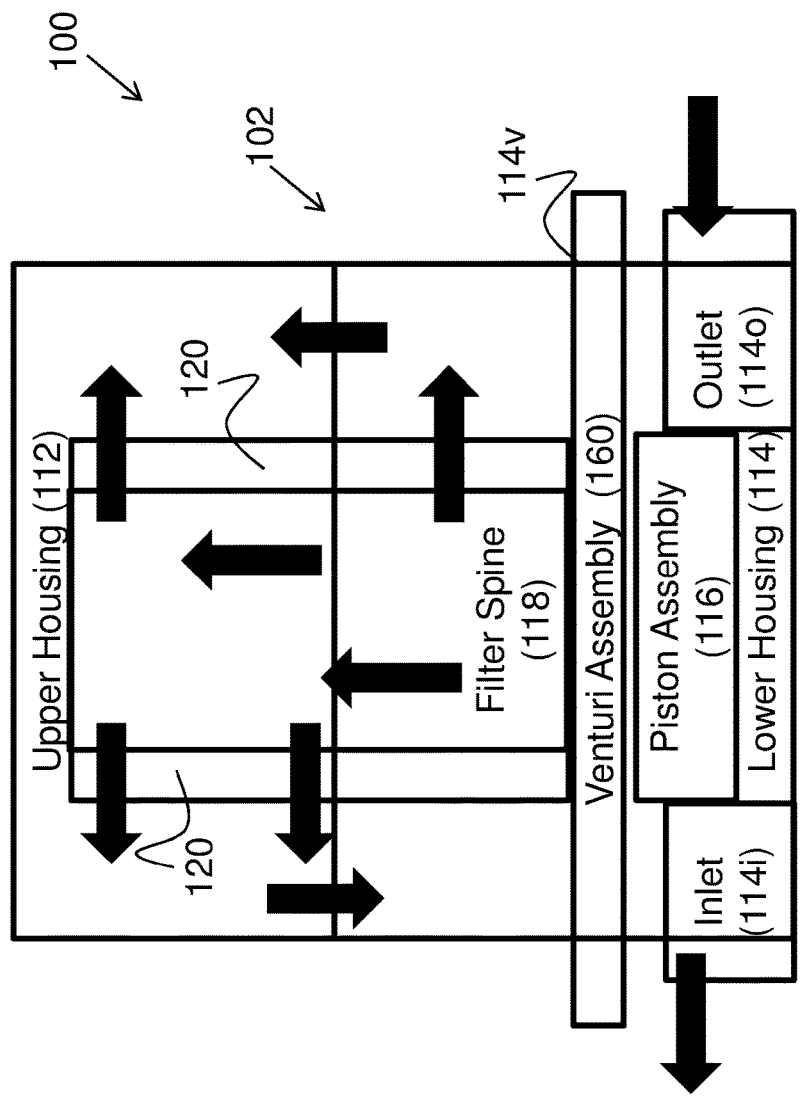
Figure 2C:
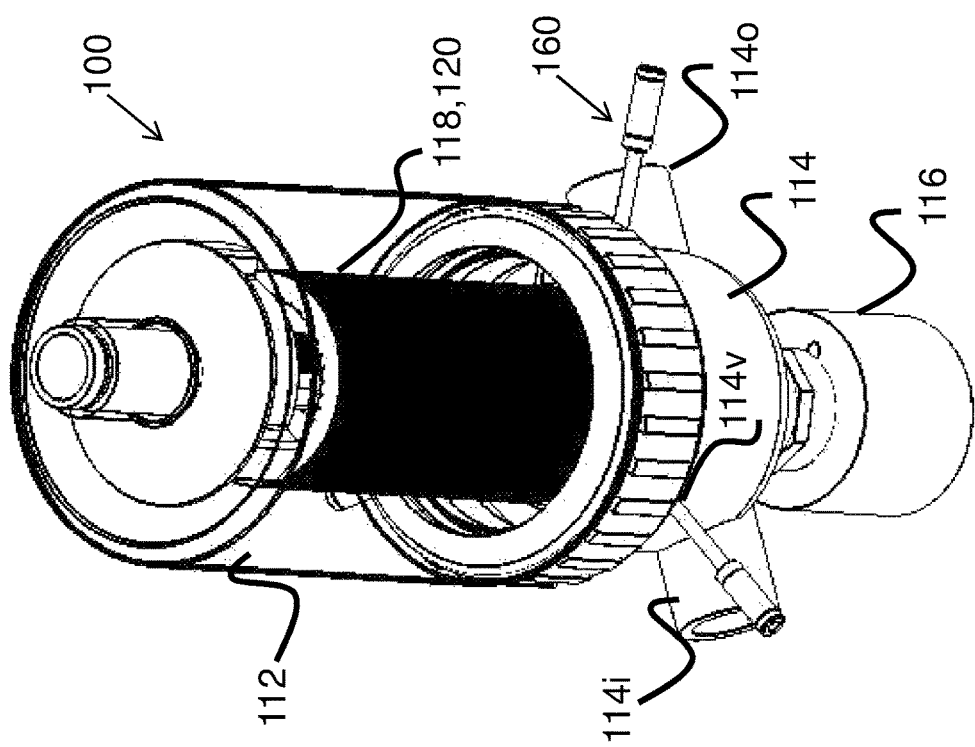
FIG. 2C is a schematic illustrative diagram of a filter apparatus according to an optional embodiment of the present invention.

FIG. 2A-B shows a schematic block diagram of filtering device 100 according to an optional embodiment of the present invention, configured to enhance the self-cleaning process of a filtering device by way of seamlessly introducing a secondary flowing fluid, for example including but not limited to air. Preferably atmospheric air may be introduced during the cleaning mode by leveraging the venturi effect with at least one or more venturi member and/or element (162,210), therein not utilizing pumps and/or air compressors or the like. Most preferably the introduction of air into the back-flushing self-cleaning stream significantly enhances the efficiency of filtering device 100.

Filter assembly 100 may optionally and preferably be used in a network of filtering elements utilizing a manifold of control valves to control the flow through the filtering device 100, as is known in the art.

Filter assembly 100 comprises a housing 102 made of at least two or more portions including an upper portion 112, a lower portion 114. Most preferably the external surface of housing 102 includes a plurality of opening dispersed about at least one of the upper portion 112 and lower portion 114, for example including but not limited to an upstream fluid inlet 114i, a downstream fluid outlet 114o, a piston assembly opening (not shown) associated with a piston assembly 116, and a venturi assembly opening 114v associated with a venture member assembly 160, and an optional a flush valve (not shown).

Internal to housing 102 filter assembly 100 preferably comprises filter spine assembly 118, a plurality of filter elements 120, a piston assembly 116 and a venturi member assembly 160.

Filter spine assembly 118 provided for receiving a plurality of filtering elements 120, that may be stacked during filtering mode and unstacked during self-cleaning. Preferably piston assembly 116 is configured to facilitate stacking a plurality of filtering elements 120 along spine assembly 118 during filtering mode and unstacking the filtering elements 120 along spine assembly 118 during self-cleaning mode.

Filter spine 118 comprises a plurality of, channels (118c) having a plurality of openings 118n forming spray nozzles that are configured to form a tangential flow directed toward the unstacked disc filters 120 utilized to spin and further clean the disc filters elements 120.

Filter assembly 100 is characterized in that it includes a venturi member assembly 160 that facilitates seamless introduction of a secondary flowing fluid, most preferably atmospheric air, into the back-flushing flow during self-cleaning mode therein enhancing the self-cleaning process. Optionally and preferably venturi member assembly 160 includes at least one venturi element and/or member 162, 210. Optionally at least a portion of venturi assembly 160 may be associated with filter assembly 100 through at least one venturi assembly opening 114v disposed on the external surface of housing 102.

Preferably at least a portion of venturi member assembly 160 is associated with the filter spine assembly 118. More preferably at least a portion of venturi assembly 160 may be associated at spine assembly 118 over an opening of spine channels 118c, therein arranged so as to introduce air into the back-flushing flow stream piped through spine channels 118c that is utilized to from the tangential flow directed toward filtering element s 120 through spray nozzle openings 118n during self-cleaning.

FIG. 2A shows the direction of flow through filter apparatus 100 during filtering mode, utilizing white arrows showing the flow during the filtering mode (from inlet 114i, through spine 118 to outlet 114o). FIG. 2B shows the direction of flow through filter apparatus 100 during back flow self-cleaning mode depicted by the black arrows showing the flow during the self-cleaning mode from outlet 114o, through spine 118, to a flush valve (not shown) associated with inlet 114i. Most preferably clean water used during the self-cleaning process is received in outlet 114o from a neighboring/adjacent filter apparatus in the filter network.

Most preferably according to an optional embodiment of the present invention during back-flow self-cleaning, represented by the black arrows, the venturi assembly 160 facilitates seamlessly introducing air into the back-flow flowing at least through channels 118c of the spine assembly 118.

Optionally a venturi element 210 (FIG. 9) may be associated over outlet port 114o provided to introduce air at the onset of the back-flow stream initiated at outlet port 114o.

Optionally venturi assembly 160 may be adapted and/or configured to be provided in the form of a retrofit venturi assembly 150 (FIG. 3B) provided to be retrofitted with a standard filter apparatus 10 such as that shown in FIG. 1.

FIG. 2B shows a perspective view of a schematic illustrative depiction of filter assembly 100 shown and described in FIG. 2A that includes a plurality of venturi member assembly 160. FIG. 2B shows a portion of venturi member assembly 160 that is disposed external to housing 102 and associated with filter assembly 100 through a plurality of venturi assembly opening 114v. Most preferably an internal portion of venturi assembly 160 is associated with a spine assembly channel 118c, most preferably with an internal venturi element and/or member 162.

FIG. 3A-D show various view of venturi member assembly 160 according to an optional embodiment of the present invention.

Figure 3A:
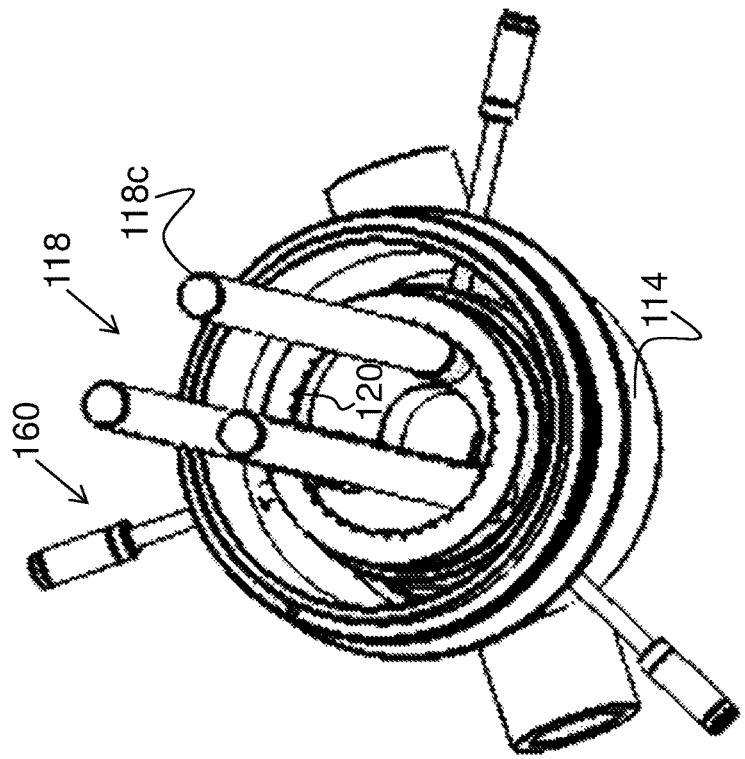
FIG. 3A-D are various views showing schematic illustrative diagrams of the core of a filter apparatus adapted to introduce a secondary flowing fluid during self-cleaning mode according to an optional embodiment of the present invention.

FIG. 3A shows a perspective view of a venturi member assembly 160 associated with a portion of filter apparatus 100. As shown, a portion of venturi member assembly 160 is disposed within lower housing 114, and another portion is disposed externally to lower housing 114. Most preferably the internal portion of venturi member assembly 160 is associated with spine assembly 118 over a portion of a spine assembly channel 118 having a disc filter element 120 associated thereon. Most preferably, venturi member assembly 160 may be associated with at least one or more spine assembly channel 118. Preferably each of the spine assembly channels 118 are associated with a portion of venturi member assembly 160.

Figure 3B:
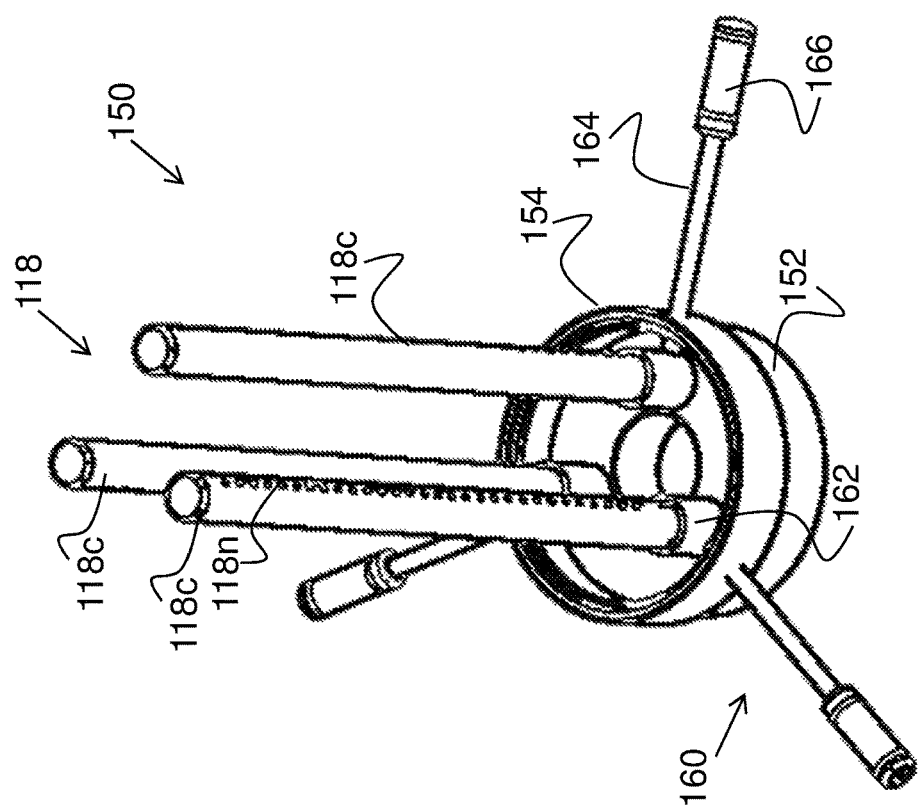

FIG. 3B shows a partial view of filter assembly 100, similar to that depicted in FIG. 3A, however with lower housing 114 removed so as to provide a perspective view filter of venturi member assembly 160 that is coupled with a portion of spine assembly 118 specifically over an open end of spine assembly channel 118c having a plurality of nozzles 118n. As shown, filter assembly 100 may comprise equal number of spine assembly channels 118c and venturi member assembly 160, that are coupled one to the other.

Figure 6B:
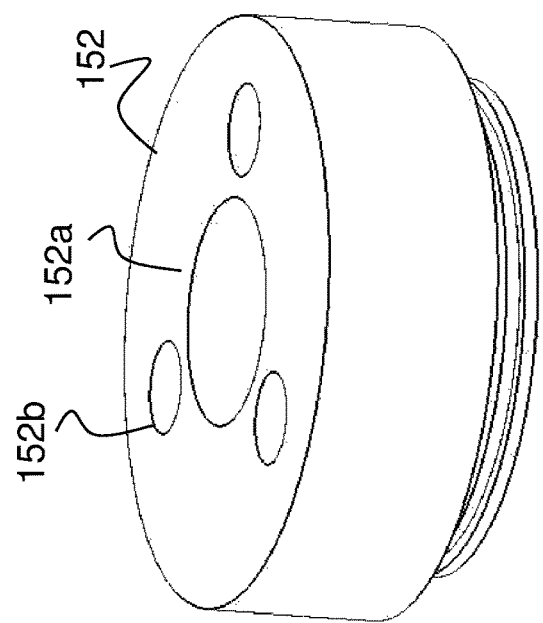
FIG. 6A-D are schematic illustrative diagrams of housing members adapted to fit with the venturi member assembly of FIG. 4, according to an optional embodiment of the present invention.
Figure 6A:
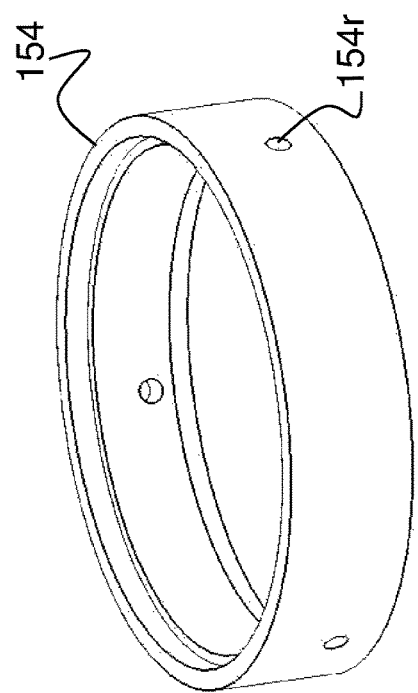

Venturi member assembly 160 may be associated within filter lower housing 114 and with spine assembly 118 with a spine assembly base 152 and a supported with a holding ring 154, shown in greater detail in FIG. 6A-B.

Optionally spine assembly base 152, holding ring 154, and at least one or more venturi member assembly 160 may be utilized to form an optional retrofit assembly 150 that may be utilized to retrofit at least one or more venturi member assembly 160 with an off the shelf filter apparatus as shown in FIG. 1. Most preferably retrofit assembly 150 when associated with an off the shelf filter apparatus 10 may be utilized to enhance and improve the filtering properties. Optionally a retrofit assembly 150 may further comprise an external housing portion, for example including but not limited to upper housing, lower housing, housing coupling ring, housing coupling nut, the same or any combination thereof that may be fit with at least a portion of the external housing of an off the shelf filter apparatus, for example filter apparatus 10 shown in FIG. 1. For example, retrofit assembly may further comprise a coupling ring (not shown) similar to holding ring 154 having threading capable of coupling between a filter housing upper portion and/or lower portion.

Venturi member assembly 160 preferably comprises, shown in greater detail in FIG. 4-5, venturi conduit member 162, tubular pipe 164 and a one way valve 166. As shown, most preferably assembly 160 is associated with spine assembly 118 by coupling venturi conduit member 162 with a spine assembly channel 118, therein introducing a secondary flowing fluid, most preferably air, into the flowing fluid flowing there through, most preferably during back-flushing self-cleaning.

Most preferably venturi assembly 160 utilizes one way valve 166 for allowing a secondary flowing fluid, most preferably atmospheric air, to flow in a unidirectional manner into tubular pipe 164, while venturi conduit member 162 facilitates leveraging the venturi effect by the creation of suction therein drawing the secondary flowing fluid from tubular pipe 164 and into conduit 162 to be mixed with the primary flowing fluid.

Figure 3C:
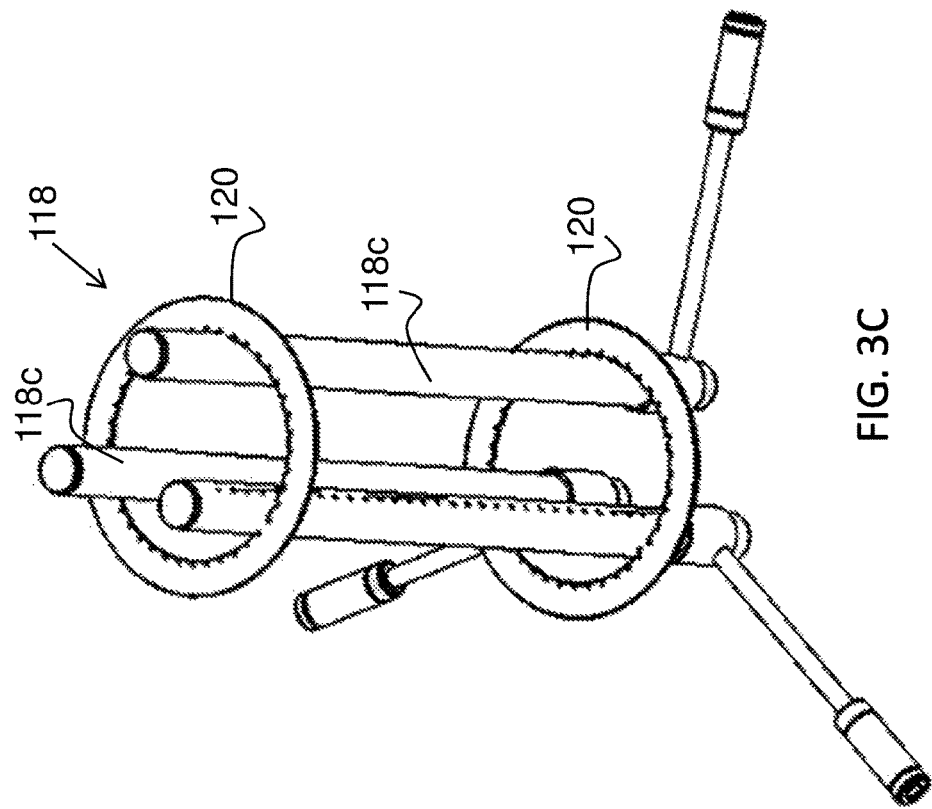
Figure 3D:
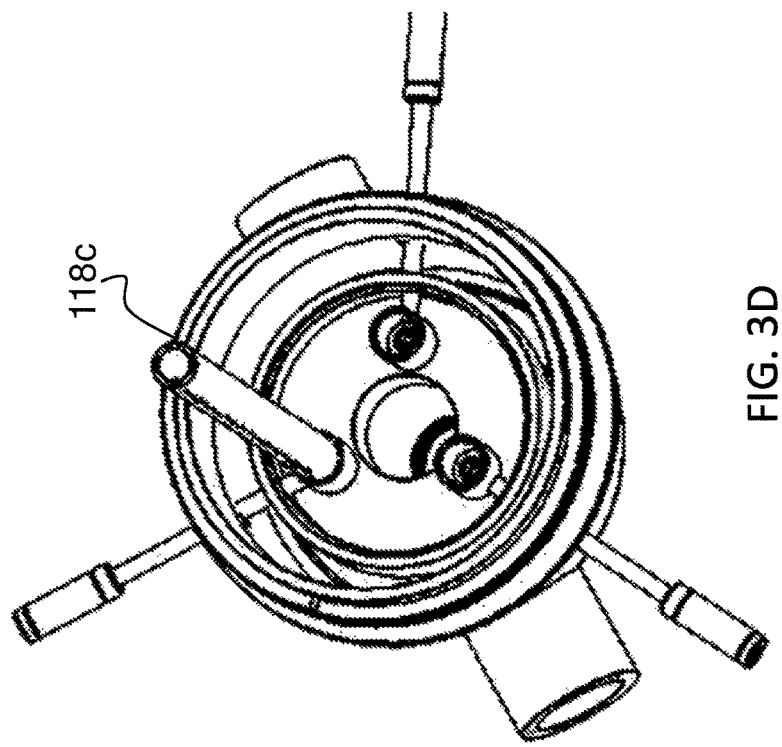

FIG. 3C-D are further perspective views showing the coupling of venturi member assembly 160 with spine assembly 118 and in particular with individual spine channels 118c.

FIG. 4 shows a perspective side view of assembly 160 including one way valve 166, tubular pipe 164, and a venturi conduit member 162. Tubular pipe 164 comprises a first end 164a associated with and in fluid communication with venturi conduit member 162, at opening 162d, and a second end 164b associated with and in fluid communication with one way valve 166. Most preferably tubular pipe 164 provides for introducing a secondary flowing fluid, most preferably air, from one way valve 166 toward conduit member 162.

Optionally one way valve 166 may be controlled remotely with a control signal for example by way of a wireless communication. Optionally and more preferably one way valve 166 is a simple check valve.

FIG. 5A-C show various view of venturi conduit member 162. Venturi conduit member 162 comprises a substantially tubular body having an external surface 162e defined between a first open end 162f and a second open end 162g. Preferably second open end 162g is in fluid communication and associated with the open end of spine assembly channel 118c, for example as shown in FIG. 3C-D. Optionally and preferably open end 162g is configured to receive spine channel 118c and therein securely associate therewith.

Optionally the tubular body 162 comprises an internal constricting passageway 162c provided to constrict the internal diameter of tubular body 162 to form a venturi element. Most preferably the constricting passageway 162c defines a first portion 162a and a second portion 162b. Preferably, the second portion 162b includes an opening 162d defined through external surface 162e, the opening 162d is disposed adjacent to the constriction point defined by the internal constriction passageway 162c.

Most preferably, during self-cleaning a back-flow downstream primary flowing fluid flows from outlet 114o through first portion 162a toward constriction point 162c, and into second portion 162b then making its way into spine assembly channel 118c. Most preferably the flow pattern through venturi member 162 and particularly constriction point 162c establishes the venturi effect that in turn produce suction at opening 162d.

Most preferably opening 162d provides an opening with which pipe first end 164a of tubular pipe 164 is coupled to venturi conduit member 162.

FIG. 6A shows a schematic diagram of an optional holding ring 154 comprising at least one or more opening 154r provided to hold and support at least a portion of tubular pipe 164.

FIG. 6B shows a schematic diagram of an optional spine assembly base member 152 configured to associate with venturi conduit member 162 and therein spine assembly 118, particularly spine assembly channel 118c. Optionally and preferably base member 152 comprises a plurality of venturi member receiving recess 152b provided for receiving at least of portion of conduit member 162, preferably along first portion 162a. Base 152 further comprises a central opening 152a, provided to be in fluid communication with the central recess of filtering elements 120. During filtering mode opening 152a allows filtered flowing fluid passing through elements 120 to flow through the opening 152a and out toward the outlet port 114o.

Optionally and preferably base member 152 provides for associating and/or coupling and/or interfacing between venturi member assembly 160, housing 102 and spine assembly 118.

Most preferably central opening 152a is opened during the filtering mode allowing clean filtered water to flow from the internal diameter of the discs filters and spine assembly and toward the outlet 114o. Most preferably central opening 152a is closed during self-cleaning mode therein directing all downstream water flow into venturi conduit member 162 of assembly 160 and onto spine channels 118c.

Figure 6C:
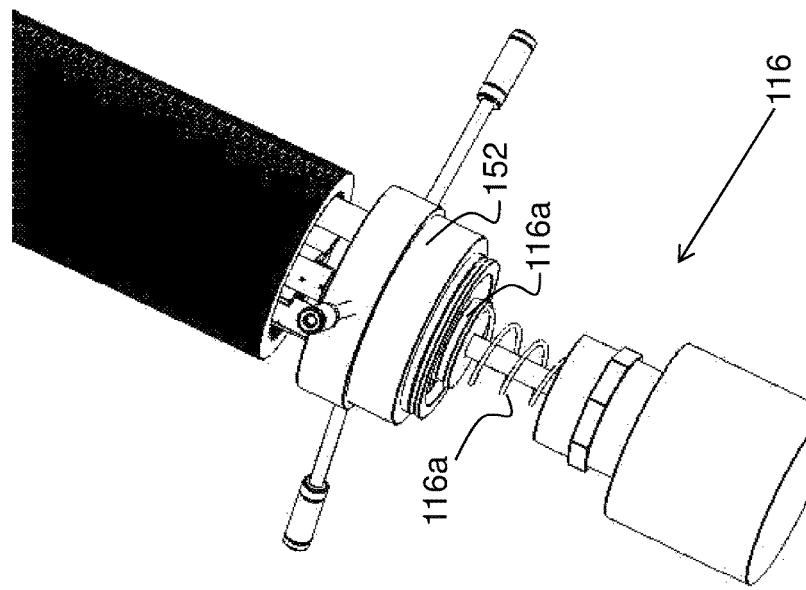
Figure 6D:
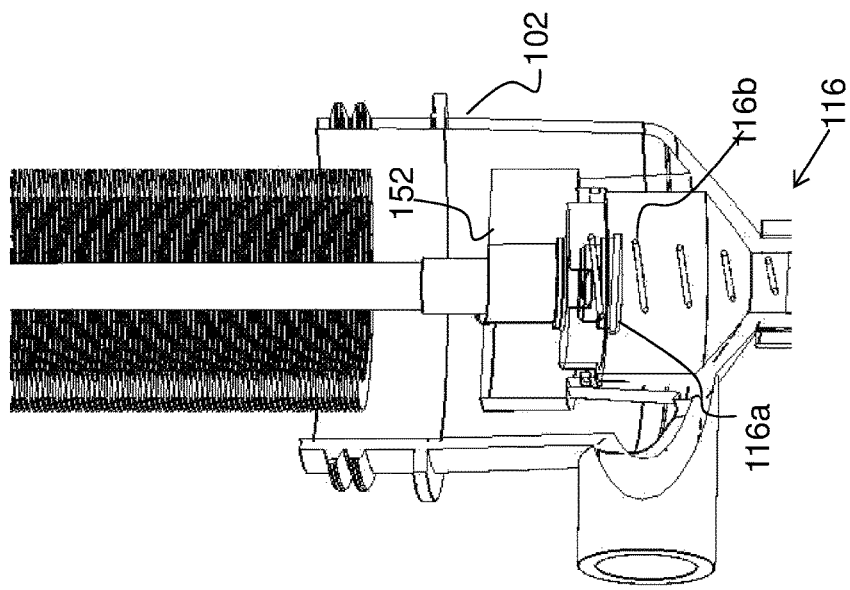

Preferably opening 152a may be opened or closed with piston assembly 116. Most preferably piston assembly 116 is associated with a one way check valve 116a that is maneuvered with piston assembly check valve spring 116b of piston assembly 116 to open or close opening 152a, for example as shown in FIG. 6C-D.

FIG. 7A shows an optional filter assembly 200 having a flush port assembly 201 that optionally includes the venturi member assembly 160 as previously described. Filter assembly 200 comprises a flush port assembly 201, a flush port valve 202. Filter assembly 200 is a self-cleaning disc filter assembly similar to that described and shown with respect to filter assembly 100 in FIG. 2-6, however, filter assembly 200 further comprises a flush port assembly 201 and a flush port valve 202.

Most preferably a flush port valve 202 is associated over a flush port disposed on a portion of filter assembly housing. Optionally the flush port may be disposed on an upper portion of filter housing or on a lower portion of filter housing.

Optionally and preferably flush port valve 202 may be provided in the form of a remotely controllable valve, for example in the form of a solenoid valve that may be opened during self-cleaning mode allowing the removal of effluent flow from within the filter apparatus. Preferably flush port valve 202 is closed during the filtering mode.

Most preferably flush port assembly 201 is provided as an additional flush valve for removing effluent flow during self-cleaning mode and in addition to a flush valve that is associated with the upstream inlet as is known in the art with state of the art reverse flow disc filters.

Optionally flush port assembly 201 may be retrofit assembly with off the shelf disc filters, 10, for example as shown and described in FIG. 1. Preferably flush port assembly 201 provides a secondary flush port for removal of effluent from the filter apparatus and is provided in addition to a flush valve manifold assembly associated with the filter housing inlet 14i, 114i as previously described.

Optionally an off the shelf disc filter 10 may be retrofit with at least one or both retrofit assembly selected form the group comprising flush port assembly 201 and/or retrofit venturi assembly 150, or a combination thereof. Optionally and preferably the retrofit assembly 201, 150 may be configured to associate with the intrinsic spine assembly 18, 118 of a filter assembly 10,100.

FIG. 7B shows flush port assembly 201 shown in FIG. 7A where the filter housing is removed. Flush port assembly 201 comprises flush port valve 202, flush assembly cap 204, suction conduit 206, and flush assembly base 208.

Flush port assembly 201 facilitate removal at least a portion of the effluent in the filter housing by allowing the effluent to flow out of the filter through valve 202 associated with a flush valve on the filter housing. Preferably effluent flows from suction conduit 206 toward a cap channel 204c internal to flush assembly cap 204 and out through valve 202. Flush assembly cap 204 is shown with exposed cap channels 204c for illustrative purposes only where the upper surface 204s, shown in FIG. 7A, and/or cover has been removed for illustrative purposes only. Most preferably channel 204c is internal to cap 204 allowing effluent to flow therethrough when valve 202 is opened. Most preferably effluent is received through suction conduit recess 206r and allowed to flow toward cap channel 204c only during self-cleaning mode.

FIG. 7C shows flush port assembly 201 with the flush valve 202 removed. Assembly 201 features a conduit 206 supported between base 208 and cap 204. Conduit 206 comprises a longitudinal recess 206r defined between base 208 and cap 204. Each of base 208 and cap 204 are provided to receive and associate with an end of conduit 206, as shown. As previously described conduit 206 is configured to receive effluent flow during self-cleaning into recess 206r to allow the effluent to flows along the length of recess 206r from adjacent to base 208 toward cap 204 and flowing toward cap channel 204c and out through flush valve assembly 202 (not shown).

Figure 7D:
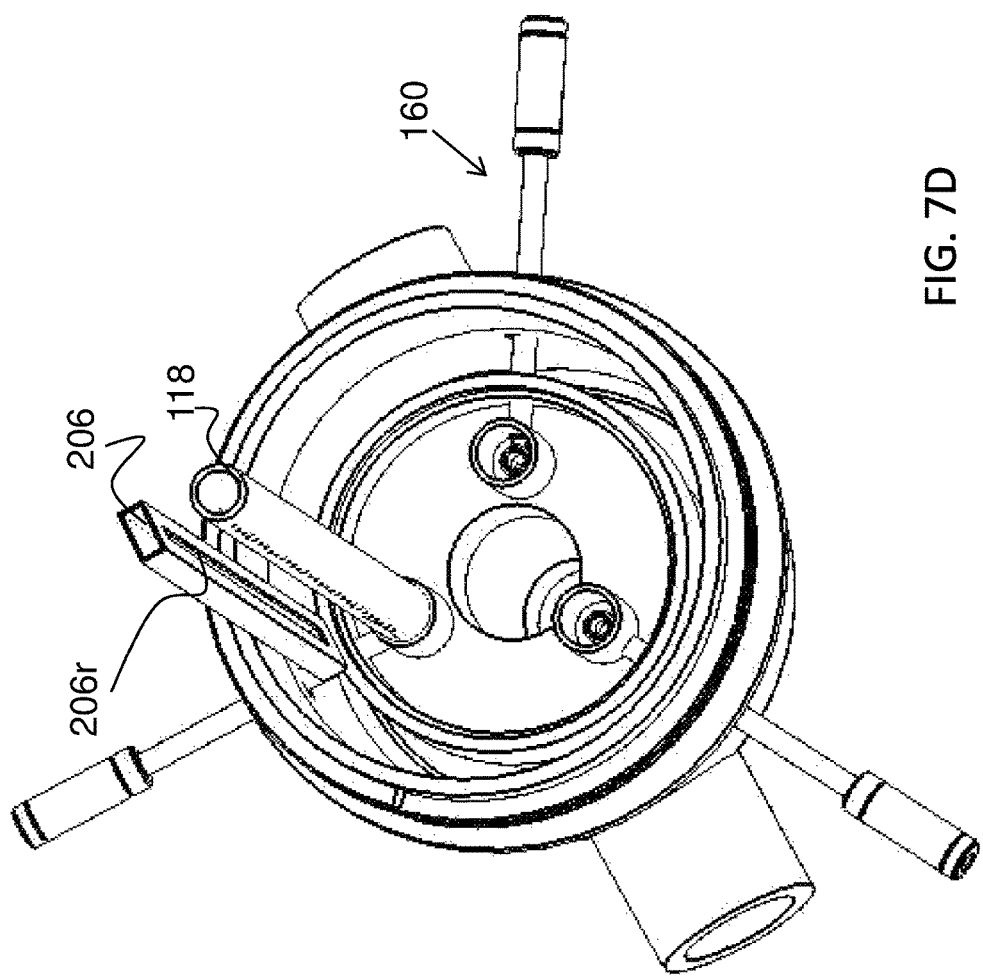

Preferably at least one or more conduit 206 is positioned parallel with the filter spine assembly. Particularly each conduit 206 is positioned to be parallel with an individual spine channel 118c. Preferably conduit 206 is oriented relative to spine channel 118c and nozzles 118n where conduit recess 206c is position to face spine channel 118c and 118n, for example as shown in FIG. 7D.

FIG. 8A shows a detailed view of conduit 206 having an open lumen disposed between a first end 206a and a second end 206b. Preferably conduit 206 comprises a recess along a portion of its length between ends 206a, 206b. Preferably recess is defined adjacent to each end 206a, 206b, for example as shown. Preferably a first end 206a is provided to associated with base 208 at a corresponding conduit receiving recess 208c (FIG. 8B). Preferably first end 206a is closed optionally with a cap and/or with receiving recess 208c. Preferably a second end 206b is provided to associated with cap 204 such that second end 206b is open and in fluid communication with cap channel 204c.

FIG. 8B shows a detailed view of base 208 having a substantially discoid body including a central opening 208o, a conduit receiving recess 208c and a spine receiving recess 208s. Preferably central opening 208o provides for allowing a flowing fluid to flow therethrough. Conduit receiving recess 208c provides for receiving and securely fitting with an end 206a of conduit 206. Spine receiving recess 208s may be configured to receive and securely fit with a spine assembly channel 118c or the like portion of a spine assembly 118. Optionally and preferably spine receiving recess 208s and conduit receiving recess 208c are aligned with one another, allowing conduit 206 and spine channel 118 to be co-planar.

FIG. 8C show detailed top perspective views of cap 204 revealing channel 204c provided to allow effluent to flow from conduit 206 received at second end 206b and exit through valve assembly 202.

FIG. 8D shows a bottom view of cap 204 comprising a conduit receiving recess 204a for receiving and associating with an second end 206b of conduit 206; and a spine receiving recess 204b for receiving and associating with portion of spine assembly 118 particularly spine channel 118c.

Figure 9:
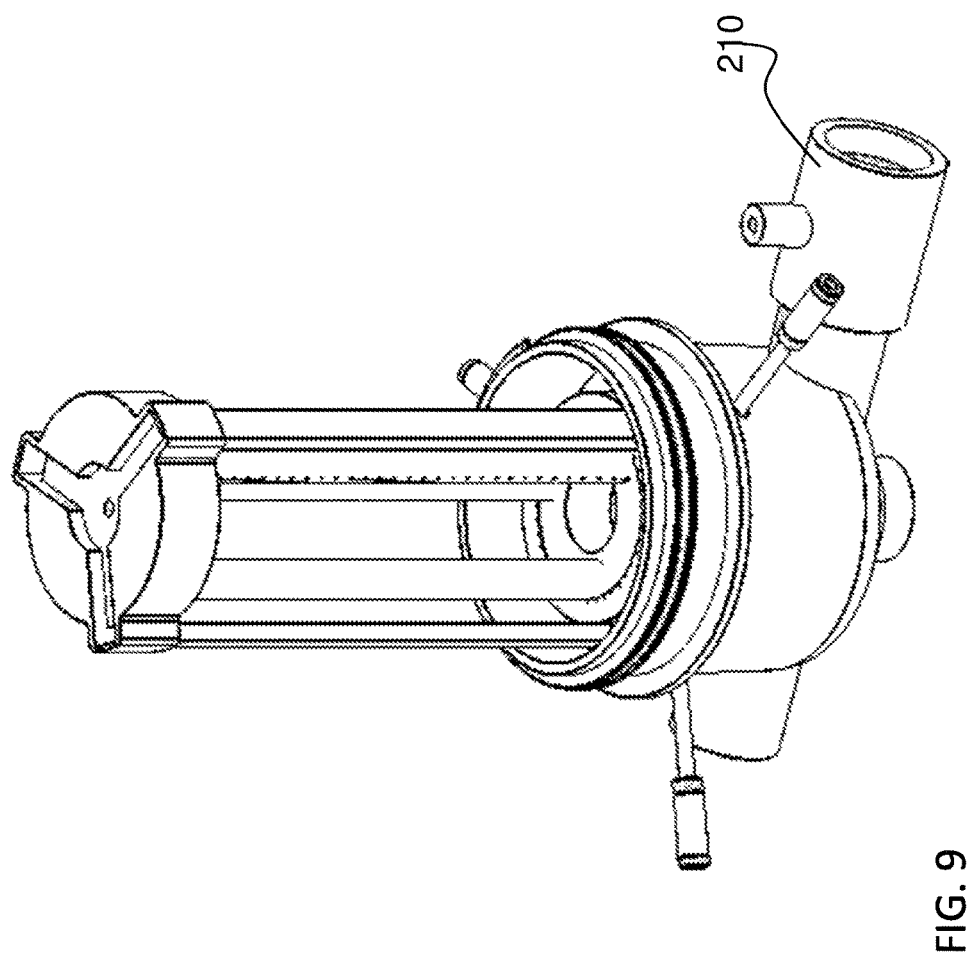
FIG. 9 is a schematic illustrative diagram of a filter apparatus according to an optional embodiment of the present invention.

FIG. 9 shows a filter apparatus that is associated with a venturi element 210 disposed about downstream outlet 114o, 14o wherein venturi element 210 is configured to leverage the venturi effect to enhance the back-flushing self-cleaning process by introducing a secondary flowing fluid, most preferably atmospheric air, into the downstream flowing fluid utilized for back-washing and flushing the filter apparatus, as previously described. Optionally venturi element 210 may be fit over the upstream inlet 114i. Optionally both upstream inlet 114i and downstream outlet 114o may be fit with at least one or more venturi elements 210.

FIG. 10A-B show filtering element in the form of a disc filter 220. Disc filter 220 comprises an inner diameter edge 220i and an external diameter edge 220e, forming a disc-like filtering element. Disc filter 220 is characterized in that inner edge 220i comprises a surface having a plurality of sail shaped triangular recess 222 that are spaced along the inner edge 220i. Optionally and preferably sail shaped triangular recess 222 is substantially a right triangle having a hypotenuse 222h that is curved, for example as shown.

Preferably adjacent sail triangular recess 222 dispersed along inner edge 220i define a substantially trapezoidal segment 224 between adjacent triangular recess 222, for example as shown in FIG. 10B.

Optionally and preferably the shape and form of recess 222 may be optimized to receive and convert the tangential flow produced by nozzle 118n during the self-cleaning phase. Most preferably, the shape of recess 222 may be optimized to facilitate spinning disc filter 220 by optimizing the energy utilization and conversion of the energy made available by the tangential flow.

FIG. 11A-B shows various view of spine assembly 118 and spine channels 118c comprising a plurality of nozzles 118n. Most preferably nozzles 118n are provided to produce a tangential flow through each nozzle, used to clean the disc filtering elements 120 across its surface. The tangential flow further causes the filtering disc elements to spin while filtered debris (effluent) is flushed away from its filtering surfaces and toward the upstream inlet 114i. In this manner the reverse flow is used for flushing the filtering elements from trapped debris by channeling the reverse flow through spine channels 118c and out through nozzles 118n.

FIG. 11A shows a perspective view of an optional spine assembly 118 comprising three spine channels 118c. Optionally spine assembly 118 may be configured to include at least one spine channel 118c. Optionally spine assembly 118 may be configured to include a plurality of spine channel 118c.

Each spine channel 118c comprises a plurality of nozzles 118n that may be dispersed along at least a portion of the length of spine channel 118c along an axis 118x. Preferably channel 118c is an open tubular channel having at least one open end 118e that is in fluid communication with the downstream outlet 114o at least during back-flow self-cleaning mode to convey the downstream cleaning fluid flow along the length of channel 118c.

Optionally each channel 118c forming assembly 118 may be configured to have a different number of nozzles along its length about axis 118x. For example, spine channel 118b is shown having nozzles 118n only along a lower portion of the spine channel adjacent to open end 118e. Optionally nozzles 118n may be distributed and/or arranged along the full length or any portion or in any manner along the length of channel 118c. For example, nozzles 118n may for example be arranged to be evenly spaced and/or provided in a group formation and/or intermittently spaced along the length of spine channel 118c. Optionally nozzles 118n may be dispersed along an upper portion, a lower portion, a middle portion, along the full length, intermittently along the length of spine channel 118c, the like arrangement, or in any combination thereof.

Optionally, nozzles 118n may be arranged in a plurality of optional configurations along the surface of spine channels 118c along a nozzle axis 118x, as shown in FIG. 11B. Optionally nozzle axis 118x may assume a plurality of optional configurations along at least a portion of the external surface of channel 118c. Optionally nozzle axis 118x may assume a plurality of optional configurations for example including but not limited to linear, radial, spiral, intermittent, arcuate, sigmoid, helical, saw-tooth, step-wise the like or any combination thereof.

Optionally nozzle 118n disposed on channel 118c may be configured to provide a controllable spray pattern and/or angle, according to a plurality of optional nozzle parameters for example including but not limited to nozzle angle, diameter, shape, intended use, location, the like or any combination thereof.

Optionally nozzle 118*n* may be configured to assume a spray angle and/or jet angle along at least one of the horizontal plane and/or vertical plane, therein allowing full control of the spray angle formed with an optional nozzle 118*n*. Optionally the spray angle may be configured according to the location of nozzle 118*n* along the length of spine channel 118*c*.

Optionally nozzles 118*n* may be provided with an angle of up to about 90 degrees in the horizontal plane. Optionally a portion of the nozzles 118*n*, disposed adjacent to the open end of 118*e* of spine channel 118*c* may be provided with an angle of up to about 60 degrees and preferably from about 5 degrees up to about 45 degrees, and more preferably about 30 degrees along at least one of the vertical plane and/or horizontal plane.

FIG. 11B shows a cross section across spine channel 118*c* showing sectional view of nozzles 118*n*. Optionally nozzles 118*n* may be configured and shaped according to a plurality of parameters for example including but not limited to nozzle diameter, nozzle shape, nozzle angle, the like parameters or any combination thereof.

Optionally nozzles 118*n*, may be further configured to produce a cleaning flowing fluid jet stream, preferably water jets, at various angles along at least one of the horizontal plane and/or vertical plane to facilitate at least one or more action, for example including but not limited to spinning, cleaning, separation of the filtering elements, cleaning along an upper surface of filtering element, cleaning along a lower surface of filtering element, the like or any combination thereof.

Optionally nozzle 118*n* may be configured according to their position and/or location along the length of channel 118*c* and/or relative proximity to end 118*e*.

Optionally nozzle 118*n* may be collectively or individually configured according to at least one or more nozzle parameters.

Optionally nozzle 118*n* may be collectively or individually configured according to the nozzle's position and/or location along channel 118*c* and at least one or more nozzle parameters.

Optionally nozzle 118*n* may be configured according an intended function relative to the disc filters 20, 120, 220 for example including but not limited to spray angle, washing, spinning, facilitating separation, washing along an upper surface, washing along a lower surface, the like or any combination thereof.

For example at least one or more nozzle 118*n* along a portion of channel 118*c*, for example as shown in FIG. 11B, may be configured to assume a spray angle of up to about 90 degrees and more preferably from about 45 degrees to about 70 degrees preferably facilitating separation, cleaning and spinning of the disc filter elements 20, 120, 220.

Optionally spine assembly 118 and/or spine channel 118*c* according to optional embodiment of the present invention may be configured to be retrofit with off the shelf filtering device 10, for example as shown in FIG. 1.

While the invention has been described with respect to a limited number of embodiment, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not described to limit the invention to the exact construction and operation shown and described and accordingly, all suitable modifications and equivalents may be resorted to, falling within the scope of the invention.

While the invention has been described with respect to a limited number of embodiments, it will be appreciated that many variations, modifications and other applications of the invention may be made.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the scope of the appended claims.

Citation or identification of any reference in this application shall not be construed as an admission that such reference is available as prior art to the invention.

Section headings are used herein to ease understanding of the specification and should not be construed as necessarily limiting.

What is claimed is:

1. A self-cleaning filter apparatus for filtering a primary flowing fluid, the apparatus adapted to be connected to a supply line for the primary flowing fluid, the self-cleaning filter apparatus amendable to operation in a filter mode or a self-cleaning mode, the apparatus comprising:
   a. a housing having an inlet on the upstream side to receive un-filtered flowing fluid, and an outlet on the downstream side to deliver clean filtered fluid,
   b. said housing adapted to encase a plurality of filtering elements utilized to filter said flowing fluid as the fluid flows from said upstream inlet to the downstream outlet, said filtering elements provided in the form of disc filters are arranged on a spine assembly, wherein said filtering elements are tightly stacked along the length of said spine during filtering mode and un-stacked during self-cleaning mode, wherein stacking and un-stacking said filtering elements on said spine is driven with a controllable piston assembly, said piston assembly controlled according to differential pressure between said inlet and said outlet to un-stack said filtering elements during self-cleaning and stack said filtering elements during filtering;
   c. said spine assembly including at least two tubular conduits having an end; said tubular conduit having a plurality of nozzle spray openings dispersed along its length, said open end provided to receive a flow of downstream flowing fluid from said downstream outlet during self-cleaning mode wherein the downstream flowing fluid flows along the length of said conduit through said open end wherein said nozzles are configured to produce tangential fluid stream of said downstream flowing fluid to clean said plurality of filtering elements during self-cleaning mode; and d. the spine assembly characterized in that each of said at least two tubular conduits feature a venturi member assembly at said open end, the venturi member assembly provided to introduce at least one secondary flowing fluid during said self-cleaning mode utilizing the venturi effect and wherein said secondary flowing fluid disposed external to said filter apparatus at about atmospheric conditions and wherein said venturi member assembly is configured to introduce said secondary flowing fluid during self-cleaning under atmospheric conditions, wherein said venturi member assembly includes:
 i) a venturi conduit member having a substantially tubular body having an external surface defined between a first open end and a second open end; said first open end is in fluid communication with said downstream outlet during the self-cleaning mode so as to receive a flow of downstream flowing fluid from said downstream outlet during self-cleaning mode; said second open end receives and houses said spine conduit open end; said tubular body having an internal constriction passageway constricting the internal diameter of said tubular body, wherein said internal constricting passageway defines a first portion and a second portion; said second portion having an opening defined on said external surface and disposed adjacent to said constriction passageway for coupling with and receiving a secondary flowing fluid tubular pipe; and
 ii) said secondary flowing fluid tubular pipe having a first end internal to said filter housing and a second end external to said filter housing, wherein said first end is coupled with said venturi conduit member adjacent to said constriction passageway at said second portion opening; and wherein said second end is coupled with a one way valve provided to introduce said secondary flowing fluid into said tubular pipe toward said first end.

2. The apparatus of claim 1 wherein said spine includes at least three tubular conduits each associated with an individual venturi member assembly.

3. The apparatus of claim 1 wherein said primary flowing fluid is water and said secondary flowing fluid is air.

4. The apparatus of claim 1 wherein said venturi conduit member is selected according to at least one parameter selected from the group consisting of the size of said constricting passageway, the internal diameter of said constriction and said opening, and any combination thereof.

5. The apparatus of claim 1 wherein said venturi conduit member is selected according to the quality of said upstream primary flowing fluid.

6. The apparatus of claim 1 wherein said venturi conduit member is selected according to the fluid pressure of said upstream primary flowing fluid.

7. The apparatus of claim 1 further comprising a flush port assembly over a flush port outlet disposed on a portion of said filter housing, the apparatus including:
a. a controllable flush valve associated with a flush port assembly cover over the flush port outlet; wherein said flush valve is closed during filtering mode and open during self-cleaning mode; said flush port assembly cover controllably associated with a flush assembly cap, said cap having at least one fluid channel disposed along a surface thereof that is in fluid communication between said controllable flush valve and at least one suction conduit;
b. said at least one suction conduit having a substantially hollow body comprising a first end associated with a flush port assembly base and a second end associating with said cap; and a longitudinal recess along the long side of said suction conduit between said base and said cap, said longitudinal recess is provided to receive a portion of the reverse flow flowing fluid used during self-cleaning; said flowing fluid is flushed from said recess, to said channel, to said port and finally exits through said flush valve during self-cleaning.

8. A venturi apparatus for retrofitting an off the shelf self-cleaning disc filter apparatus, the apparatus comprising:
a. a retrofit housing for securely coupling with at least one portion of said off the shelf self-cleaning disc filer housing;
b. an adaptor for securely coupling with a spine assembly of said off the shelf cleaning disc filter featuring at least two tubular conduits having an open end, said adaptor comprising at least two venturi member assemblies provided to introduce at least one secondary flowing fluid during said self-cleaning mode, said venturi member assembly comprising
 i) a venturi conduit member having a substantially tubular body having an external surface defined between a first open end and a second open end; said first open end in fluid communication with said downstream outlet during the self-cleaning mode so as to receive a flow of downstream flowing fluid from said downstream outlet during self-cleaning mode, said second open end receives and houses said open end of said spine assembly, said tubular body having an internal passageway constricting the internal diameter of said tubular body, wherein said internal constricting passageway defines a first portion and a second portion; said second portion having an opening defined on said external surface and disposed adjacent to said constriction passageway for coupling with and receiving a secondary flowing fluid tubular pipe;
 ii) said secondary flowing fluid tubular pipe having a first end internal to said retrofit housing and a second end external to said retrofit housing, wherein said first end is is coupled with said venturi conduit member at said second portion opening adjacent to said constricting passageway; and said second end coupled with a one way valve provided to introduce said secondary flowing fluid into said tubular pipe toward said first end.

9. The filter apparatus of claim 6 wherein the working pressure during self-cleaning mode is at least 0.8 bar, therein retaining more downstream clean flowing fluid.

10. A self-cleaning filter apparatus for filtering a primary flowing fluid, the apparatus adapted to be connected to a supply line for the primary flowing fluid, the self-cleaning filter apparatus amendable to operation in a filter mode or a self-cleaning mode, the apparatus comprising:
a. a housing having an inlet on the upstream side to receive un-filtered flowing fluid, an outlet on the downstream side to deliver clean filtered fluid, and a flush port outlet for removing filtered debris;
b. said flush port outlet associated with a flush port assembly including a controllable flush valve; wherein said flush valve is closed during filtering mode and open during self-cleaning mode;

c. said housing adapted to encase a plurality of filtering elements utilized to filter said flowing fluid as the fluid flows from said upstream inlet to the downstream outlet, said filtering elements provided in the form of disc filters are arranged on a spine assembly, wherein said filtering elements are tightly stacked along the length of said spine during filtering mode and un-stacked during self-cleaning mode, wherein stacking and un-stacking said filtering elements on said spine is driven with a controllable piston assembly, said piston assembly controlled according to differential pressure between said inlet and said outlet to un-stack said filtering elements during self-cleaning and stack said filtering elements during filtering;

d. said spine assembly including at least two tubular conduit having an open end; said tubular conduit having a plurality of nozzle spray openings dispersed along its length, said open end provided to receive a flow of downstream flowing fluid from said downstream outlet during self-cleaning mode wherein the downstream flowing fluid flows along the length of said conduit through said open end wherein said nozzles are configured to produce tangential fluid stream of said downstream flowing fluid to clean said plurality of filtering elements during self-cleaning mode; and e. the spine assembly characterized in that each of said at least two tubular conduits having an open end feature a venturi member assembly at said open end, the venturi member assembly including:

i) a venturi element provided to introduce at least one secondary flowing fluid during said self-cleaning mode utilizing the venturi effect and wherein said secondary flowing fluid is disposed external to said housing at about atmospheric conditions and wherein said venturi member assembly is configured to introduce said secondary flowing fluid during self-cleaning under atmospheric conditions ; said venturi member assembly is coupled to and featured at said open end of said spine assembly; where said venturi member assembly including:

ii) a venturi conduit member having a substantially tubular body having an external surface defined between a first open end and a second open end; said first open end in fluid communication with said downstream outlet during the self-cleaning mode so as to receive a flow of downstream flowing fluid from said downstream outlet during self-cleaning mode, said second open end is configured to receive and house said spine conduit open end, said tubular body having an internal passageway constricting the internal diameter of said tubular body, wherein said constricting passageway defines a first portion and a second portion; said second portion having an opening defined on said external surface disposed adjacent to said constriction passageway for coupling with and receiving a secondary flowing fluid tubular pipe; and;

iii) said secondary flowing fluid tubular pipe having a first end internal to said filter housing and a second end external to said filter housing, wherein said first end is in fluid communication with and coupled with said venturi conduit member over said opening disposed adjacent to said constriction passageway; and wherein said second end is coupled with a one way valve provided to introduce said secondary flowing fluid into said tubular pipe toward said first end;

f. and wherein said primary flowing fluid is water and said secondary flowing fluid is air, and wherein the working pressure of said primary flowing fluid during self-cleaning mode is at least 0.8 bar.

11. The apparatus of claim 8, further comprising a spine assembly including:

a. at least one tubular conduit having an open end and a plurality of nozzle spray openings dispersed along its length;

b. said open end provided to receive a flow of clean flowing fluid during self-cleaning mode, wherein the clean flowing fluid flows along the length of said tubular conduit through said open end, and wherein said nozzles are configured to produce tangential fluid stream; and wherein said open end featuring said venturi member assembly.

* * * * *